(12) United States Patent
Al-Dashti

(10) Patent No.: US 8,635,793 B1
(45) Date of Patent: Jan. 28, 2014

(54) VISUAL ALERT FOR PLACEMENT ON FREE-RANGE ANIMALS

(71) Applicant: Salman Abdullah Al-Dashti, Jabriya (KW)

(72) Inventor: Salman Abdullah Al-Dashti, Jabriya (KW)

(*) Notice: Subject to any disclaimer, the term of this patent is extended or adjusted under 35 U.S.C. 154(b) by 0 days.

(21) Appl. No.: 13/686,792

(22) Filed: Nov. 27, 2012

(51) Int. Cl.
| G06F 3/00 | (2006.01) |
| G09F 19/08 | (2006.01) |
| G09F 19/00 | (2006.01) |
| A44C 5/00 | (2006.01) |
| A61B 5/103 | (2006.01) |
| A61B 5/117 | (2006.01) |
| A41D 20/00 | (2006.01) |
| A41D 13/08 | (2006.01) |

(52) U.S. Cl.
USPC .......... 40/300; 40/304; 40/412; 40/439; 40/440; 40/441; 40/637; 40/633; 40/665; 40/306; 40/586; 119/654; 116/22 A; 446/218; 2/170; 2/16; 2/162

(58) Field of Classification Search
USPC .......... 40/304, 300, 412, 439, 440, 441, 306, 40/637, 633, 665, 586; 446/218; 116/22 A; 119/654; 2/170, 16, 162
See application file for complete search history.

(56) References Cited

U.S. PATENT DOCUMENTS

| 2,194,220 A | * | 3/1940 | Elder .............................. 40/637 |
| 4,512,096 A | | 4/1985 | Heidecker |
| 5,922,422 A | * | 7/1999 | Otruba ........................ 428/34.1 |
| 2007/0137587 A1 | | 6/2007 | Starko |
| 2007/0144047 A1 | * | 6/2007 | Singh ............................. 40/633 |
| 2007/0245612 A1 | * | 10/2007 | Tresenfeld ..................... 40/665 |
| 2007/0256646 A1 | | 11/2007 | Ayscue |
| 2012/0085298 A1 | | 4/2012 | Wolters |

FOREIGN PATENT DOCUMENTS

| AU | 2008100353 | 5/2008 |
| GB | 2237493 | 8/1991 |

* cited by examiner

*Primary Examiner* — Syed A Islam
(74) *Attorney, Agent, or Firm* — Richard C. Litman

(57) ABSTRACT

The visual alert for placement on free-range animals includes active and/or passive lighting to alert motor vehicle drivers of such animals crossing the roadway when traveling through open rangeland. The visual alert is a sleeve having fins extending radially therefrom, the fins having reflective and/or active lighting elements thereon. Power for active lighting is provided by electrical batteries that are recharged during daylight. The permanently installed sleeve may be formed as a circumferentially closed distensible unit that passes over the hoof of the animal, or as an open sheet that is rolled about the leg of the animal and permanently secured by plastic ties or other suitable elements. The sleeve is lined with a non-abrasive material to preclude injury to the animal during long term wear.

11 Claims, 3 Drawing Sheets

VISUAL ALERT FOR PLACEMENT ON FREE-RANGE ANIMALS

BACKGROUND OF THE INVENTION

1. Field of the Invention

The present invention relates generally to alarms and warning devices, and more particularly to a visual alert for placement on free-range animals.

2. Description of the Related Art

Many areas of open range land still exist in many parts of the world. In many of these areas domesticated livestock is free to roam about the land, and the owners of the livestock periodically round the animals up as needed for care or for transport to a different range or to market, etc. Such open-range animals are primarily cattle in the USA, but other animal species, e.g., camels in the Middle East, are also allowed to roam freely over such open range land.

Such free-range or open-range lands often extend across public right of ways, such as roads and highways, and the shoulders of such roads are often left unfenced due to the expense of fencing miles of roadway along both sides, and also to preserve the open rangeland and the ability of animals (both wild and domestic) to roam freely across the entire range. While most domestic animals will rest at night, some will nevertheless continue to roam and may wander across a public roadway that crosses through open rangeland. Most such large domesticated animals that may roam over open rangeland tend to be dark in color, or at least some neutral color, and are generally difficult to see at night. Of course, there is no artificial lighting (street lights, etc.) provided in such areas due to the relatively light traffic and the long distances over which such roads and highways extend.

While the headlights of a motor vehicle should provide sufficient illumination to see such an animal if the vehicle is traveling at a reasonable speed, animals are well known to move directly into the path of a motor vehicle with no notice from a position outside the area of illumination provided by the lights of the vehicle. These animals weigh several hundred pounds or more when mature. A collision with such an animal may result in serious injury or death to the occupants of the motor vehicle, as well as to the animal. Aside from whatever responsibility the owner of the animal may have in such an accident, the life and financial worth of a valuable animal is also lost when such an accident occurs.

While various collars, harnesses, etc. with active or passive lighting have been developed for smaller domestic animals, such as household pets, most attachments for larger domesticated animals, such as cattle and the like, have been directed more to identification means for the animal to facilitate positive identification by the owner during roundup or other times when needed. Such identification means for large domestic animals (e.g., branding, ear tags, embedded microchips, etc.) does nothing to increase the visibility of the animal, either during daylight hours or during periods of darkness or low visibility.

Thus, a visual alert for placement on free-range animals solving the aforementioned problems is desired.

SUMMARY OF THE INVENTION

The visual alert for placement on free-range animals comprises an elongate sleeve that secures permanently about the leg of a large animal, such as a cow, steer, horse, etc. The sleeve includes passive and/or active lighting in the form of reflective patterns and light emitting diodes (LEDs) thereon. The active lighting is powered by batteries contained on or in the sleeve. Solar cells charge the batteries during daylight hours when the lights are not needed. Additional visibility is provided by fins that extend radially from the generally cylindrical sleeve. The sleeve and fins preferably are formed of a brightly colored material. The sleeve is intended as a permanent installation on the leg of the animal, and is therefore provided with a relatively soft, non-abrasive liner. The sleeve also preferably includes some form of data stored thereon, e.g., a bar code or the like, to facilitate identification of the animal and/or the owner of the animal. Additional volatile data storage may be provided to provide for updating such information as the age of the animal, medical treatment, breeding record, etc.

In a first embodiment, the visual alert comprises a circumferentially closed and unbroken sleeve that is passed over the hoof of the animal for permanent installation on some portion of the leg. The basic sleeve may be formed of a sturdy synthetic woven fabric, such as Nylon® or the like. The sleeve is provided with sufficient stretch to pass over the hoof of the animal, while still conforming closely to the leg of the animal after installation in order to preclude inadvertent removal or loss. In a second embodiment, the visual alert comprises a sleeve that is open along its length, i.e., a generally flat sheet of material that may be rolled about the leg of the animal and secured to form a closed sleeve for permanent installation. The sleeve may be secured with permanent plastic ties, light wire or cable, etc., wrapped around the sleeve or woven or otherwise secured through the body of the sleeve, so long as the attachment or securing means is permanent in order to preclude inadvertent removal or loss.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The visual alert for placement on free-range animals provides a means for the ready recognition of a potential obstruction to a motor vehicle driver when such an animal crosses a road or highway at night, or in periods of poor illumination. The device also preferably includes electronic data storage for identifying the animal and various characteristics of the animal.

Figure 1:
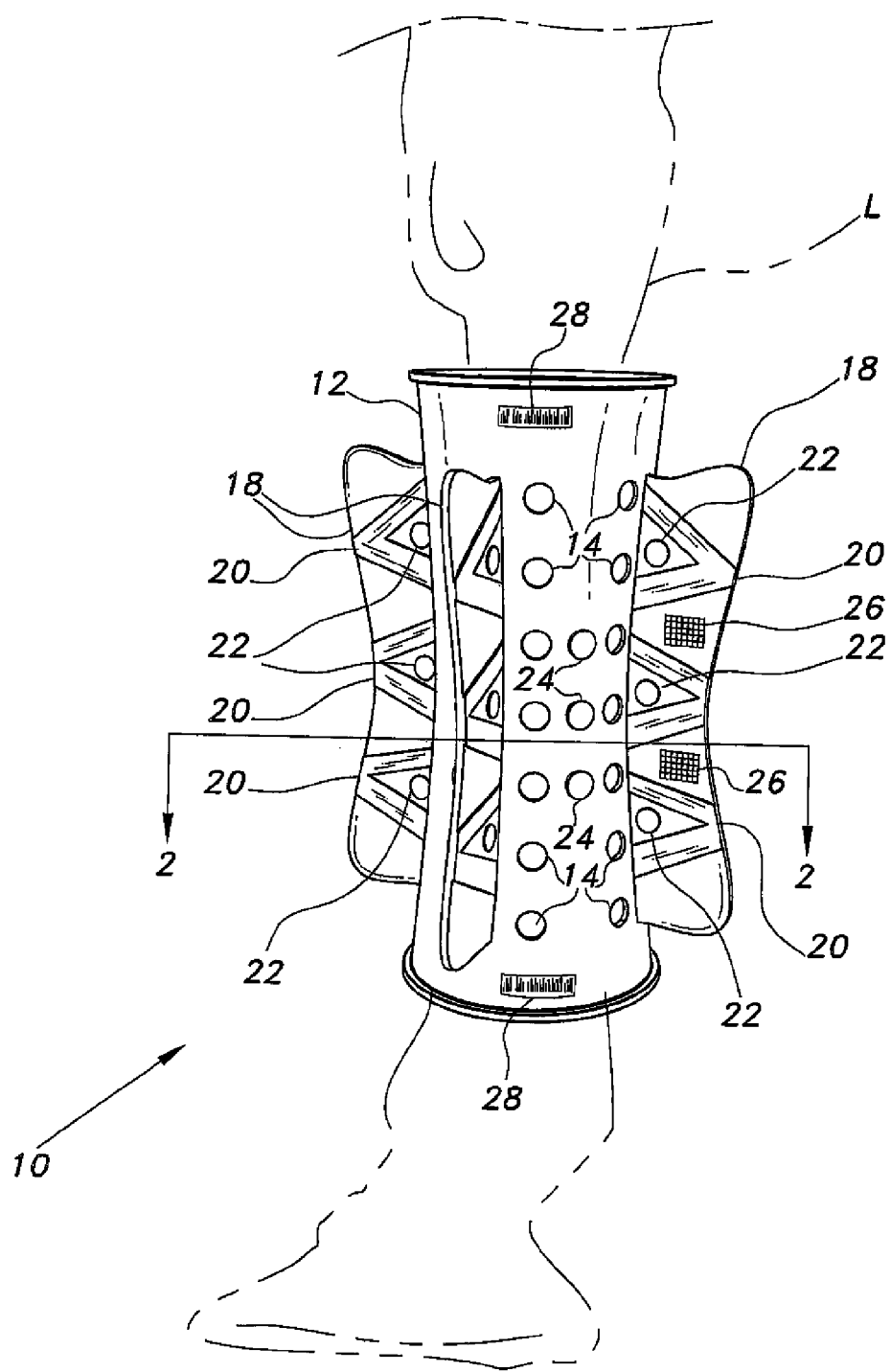
FIG. 1 is an environmental, perspective view of a first embodiment of a visual alert for placement on free-range animals according to the present invention, illustrating its general configuration.
Figure 2:
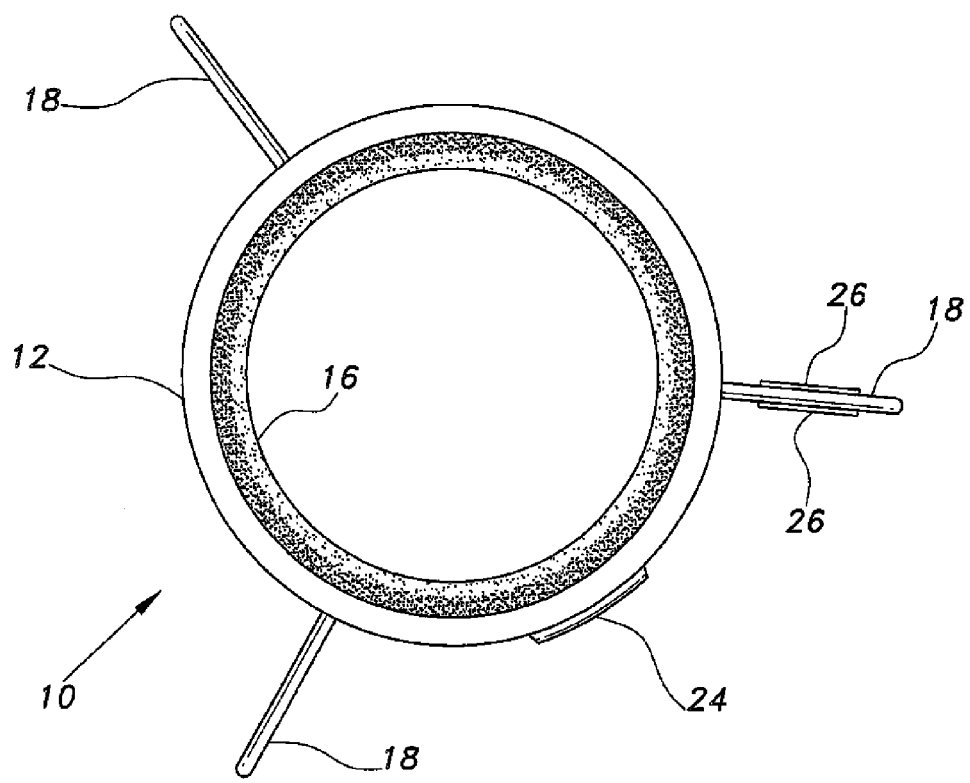
FIG. 2 is a section view along lines 2-2 of FIG. 1.

FIG. 1 of the drawings is an environmental perspective view of a first embodiment of the visual alert 10 installed upon the leg L of an animal, the leg L being shown in broken lines. FIG. 2 provides a section view along lines 2-2 of FIG. 1. The visual alert 10 comprises a circumferentially closed sleeve 12 formed of a flexible material to provide the necessary flexure to accompany leg movement by the animal and to provide for installation of the sleeve 12 upon the leg L. The flexible material may comprise a sturdy woven synthetic fabric material, e.g., Nylon®. The material provides sufficient stretch or resilience to be passed over the hoof of the animal, while still retaining a secure fit about the leg L of the animal. The Nylon® fabric material may be knit in order to provide the required distension. In any event, it is preferred that the material of which the sleeve 12 is made be brightly colored for greater visibility.

It is intended that the sleeve 12 be a permanent installation upon the leg L of the animal. Accordingly, various considerations for the comfort and well-being of the animal are provided. The sleeve 12 includes a large number of ventilation passages 14 therethrough, and the internal surface of the sleeve 12 is lined with a non-abrasive material 16 (shown in FIG. 2), such as cotton or wool, to preclude abrasion of the skin of the animal. The ventilation passages 14 will be understood to extend substantially uniformly about the circumference of the sleeve 12, and from near one end of the sleeve 12 to near the opposite end. The non-abrasive liner 16 will be understood to cover substantially the entire inner surface of the sleeve 12.

A plurality of fins 18 extends radially outward from the sleeve 12. The fins 18 are preferably uniformly disposed about the circumference of the sleeve 12, and extend from near one end to near the opposite end of the sleeve. The fins 18 are preferably formed of a flexible material, e.g, Nylon® fabric, and are preferably permanently but flexibly attached to the sleeve 12. Alternatively, the sleeve and its fins may be molded or otherwise formed of a flexible plastic material as a unitary component to provide greater strength and resistance to tearing of the fins from the sleeve. As in the case of the material of which the sleeve 12 is formed, the material used to construct the fins 18 is preferably also brightly colored. The fins 18 preferably have relatively low aspect ratios, i.e., they have widths (from one end to the other end of the sleeve) much larger than their heights, somewhat in the manner of the fletching of an arrow shaft. Each of the fins 18 includes some form of passive lighting thereon, e.g., the chevron pattern of reflective stripes 20 shown in FIG. 1. The reflective stripes 20 may be fluorescent or phosphorescent, or other highly reflective or light-emitting character.

The fins 18 also preferably include a plurality of primary light emitting or projecting sources 22 thereon, e.g., light emitting diodes (LEDs). Accordingly, one or more electrical storage batteries 24 are installed to power the lights 22. The batteries 24 may be relatively small, as the LEDs are relatively energy efficient and need only operate for a time period on the order of twelve hours, more or less. Conventional circuitry may be used to cause the lights 22 to flash intermittently, if desired. This provides two benefits: (1) the intermittent energizing of the lights results in some savings of energy (depending upon the type of light used), thereby prolonging the battery charge; and (2) the intermittent flashing is more likely to catch the attention of a person approaching the animal wearing the visual alert device 10. The batteries 24 are recharged during periods of daylight or sufficient brightness, by one or more solar cells 26. The solar cells 26 may be installed on one or more of the fins 18 in proximity to their respective lights 22. The batteries 24 may be installed in suitable locations on the sleeve 12. The circuitry for recharging the batteries 24 from the solar cells 26 is conventional, and is not described further herein.

The visual alert 10 preferably further includes data stored upon the sleeve 12. The data may comprise conventional bar code labels 28, as shown, and/or some form of volatile electronic data storage permitting the data to be amended and revised as needed. Since the visual alert 10 is permanently installed upon the animal, an electronic data storage device may be used in lieu of conventional branding, ear tags, etc., to avoid trauma to the animal. For example, the data storage may include coded information of the owner of the animal, the medical and/or breeding history of the animal, etc. Provision for updating the information allows for ownership changes, changes in medical and/or breeding history, etc.

Figure 3:
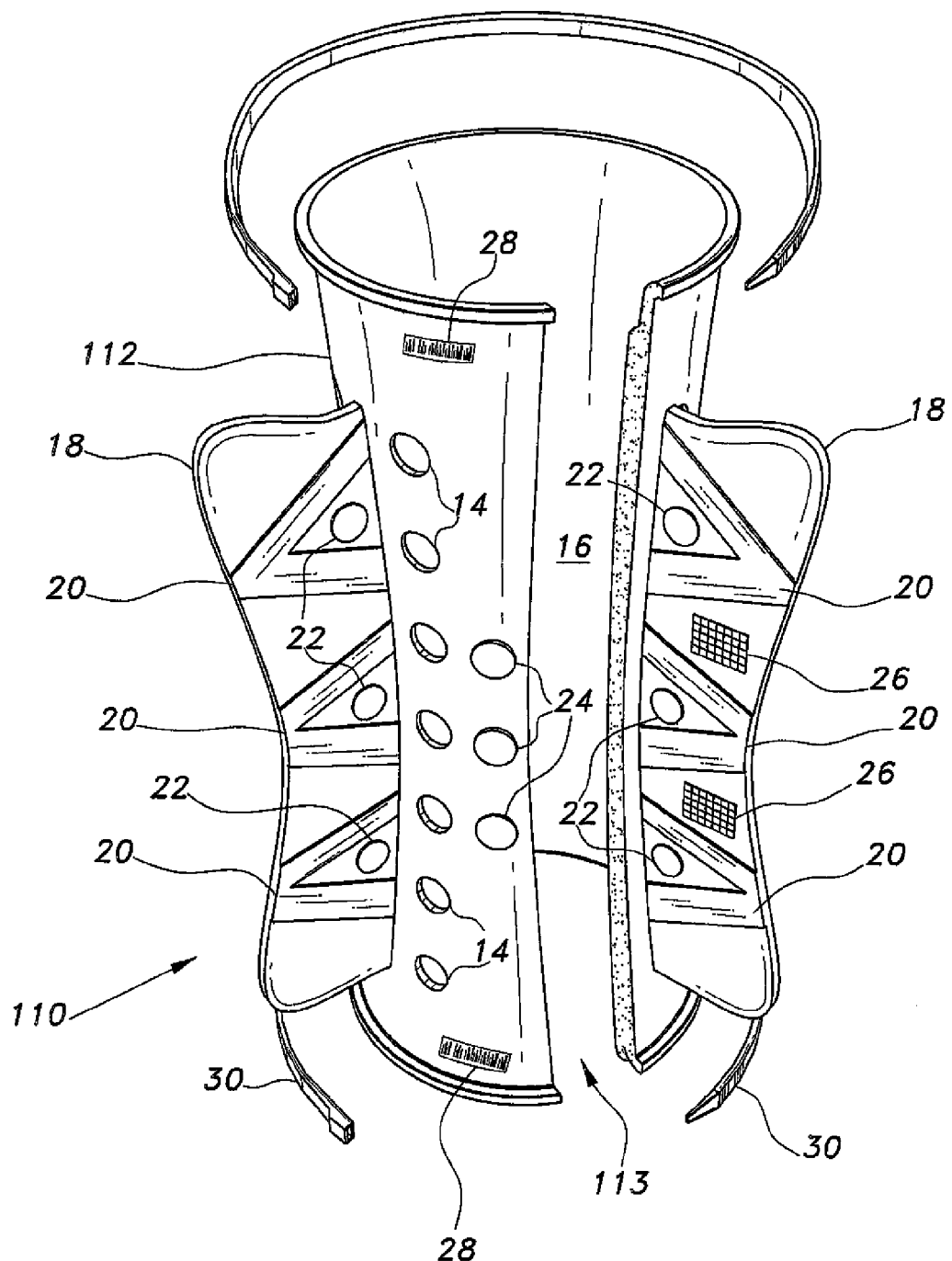
FIG. 3 is a perspective view of a second embodiment of a visual alert for placement on free-range animals according to the present invention, illustrating various details thereof.

FIG. 3 of the drawings provides an illustration of an alternative embodiment of the visual alert device, designated as visual alert 110. The visual alert device 110 differs from the visual alert 10 of FIGS. 1 and 2 in that the sleeve 112 of the visual alert 110 is circumferentially discontinuous, having an opening 113 therein extending completely from one end to the other of the sleeve 112. Topologically the sleeve 112 may be opened to form a substantially flat sheet of material. Otherwise, the components of the sleeve 112 are substantially identical to those of the sleeve 12 of FIGS. 1 and 2. For example, the sleeve 112 may have ventilation passages 14, a non-abrasive liner 16, fins 18 having reflective stripes 20, electric lights 22 and solar cells 26 on the fins 18, batteries 24, and a bar code label 28 installed on the outer surface of the sleeve 112.

Since the sleeve 112 may be opened for installation upon the leg of an animal, the material of which the sleeve 112 is made may be somewhat less distensible or resilient than that of the sleeve 12 of FIGS. 1 and 2. A heavy Nylon® fabric duck material or the like may be used to form the sleeve 112, the non-abrasive inner liner 16 providing protection for the animal. The sleeve 112 is installed upon the leg of an animal by opening the sleeve along the elongate opening 113 and wrapping the sleeve 112 about the leg of the animal. The sleeve 112 is permanently secured to the leg of the animal by a plurality of permanent plastic ties 30 (e.g., TyRaps®) extending circumferentially around the sleeve 112 above and below the fins 18, or other suitable durable and permanent attachment means.

It is to be understood that the present invention is not limited to the embodiments described above, but encompasses any and all embodiments within the scope of the following claims.

I claim:

1. A visual alert for placement on free-range animals, comprising:
    a flexible circumferentially continuous sleeve, formed of a distensible fabric material, adapted for placement upon the leg of an animal;
    the sleeve having a plurality of ventilation passages therethrough, and a non-abrasive liner disposed therein;
    a bar code label disposed on the sleeve, the bar code label encoding information identifying the animal;
    a plurality of radially disposed flexible fins extending outward from the sleeve; and
    a plurality of light projecting elements disposed upon the fins.

2. The visual alert for placement on free-range animals according to claim 1, wherein the light projecting elements comprise electrically powered lights, the visual alert further comprising:
    at least one electrical storage battery disposed on the sleeve; and
    at least one solar cell disposed on the sleeve, the solar cell communicating electrically with the at least one electrical storage battery, the lights selectively receiving electrical power from the at least one electrical storage battery.

3. The visual alert for placement on free-range animals according to claim 1, wherein the light projecting elements comprise reflectors.

4. A visual alert for placement on flee-range animals, comprising: a flexible sleeve, having a circumferentially discontinuous structure, adapted for permanent placement upon the leg of an animal, the sleeve having a plurality of ventilation passages therethrough; a non-abrasive liner disposed within the sleeve; wherein the sleeve is formed of a distensible fabric material; a plurality of permanent fasteners disposed about the sleeve along the discontinuous structure; wherein the fasteners are for securing the sleeve permanently to the leg of an animal; and light projecting elements disposed upon the sleeve, further comprising a plurality of radially disposed flexible fins extending outward from the sleeve, the light projecting elements being disposed upon the fins.

5. The visual alert for placement on free-range animals according to claim 4, wherein the light projecting elements comprise electrically powered lights, the visual alert further comprising:

at least one electrical storage battery disposed on the sleeve; and at least one solar cell disposed on the sleeve, the solar cell communicating electrically with the at least one electrical storage battery, the lights selectively receiving electrical power from the at least one electrical storage battery.

6. The visual alert for placement on free-range animals according to claim 4, wherein the light projecting elements comprise reflectors.

7. The visual alert for placement on free-range animals according to claim 4, further comprising a bar code label disposed on the sleeve, the bar code label encoding information identifying the animal.

8. A visual alert for placement on free-range animals, comprising:

an elongate, flexible sleeve, having a circumferentially closed structure, adapted for placement upon the leg of an animal;

a liner disposed in and coextensive with the elongate, flexible sleeve;

wherein the sleeve and liner being formed of distensible fabric material;

light projecting elements disposed upon the sleeve;

a plurality of radially disposed flexible fins extending outward from the sleeve, the light projecting elements being disposed upon the fins; and a bar code label disposed on the sleeve, the bar code label encoding information identifying the animal.

9. The visual alert for placement on free-range animals according to claim 8, wherein the light projecting elements comprise electrically powered lights, the visual alert further comprising:

at least one electrical storage battery disposed on the sleeve; and at least one solar cell disposed on the sleeve, the solar cell communicating electrically with the at least one electrical storage battery, the lights selectively receiving electrical power from the at least one electrical storage battery.

10. The visual alert for placement on free-range animals according to claim 8, wherein the light projecting elements comprise reflectors.

11. The visual alert for placement on free-range animals according to claim 8, wherein the sleeve has a plurality of ventilation passages therethrough, and the liner being formed of a non-abrasive material.

\* \* \* \* \*